United States Patent
Tieys et al.

(10) Patent No.: US 9,376,203 B2
(45) Date of Patent: Jun. 28, 2016

(54) DEVICE FOR MECHANICAL CONNECTION OF A CONTROL SURFACE TO A FIXED STRUCTURAL ELEMENT OF AN AIRCRAFT AND AIRCRAFT WING ELEMENT EQUIPPED WITH SAID DEVICE

(71) Applicant: Airbus Operations (SAS), Toulouse (FR)

(72) Inventors: Pierre Tieys, Tournefeuille (FR); Alain Sagansan, Colomiers (FR); Laurent Andrieu, Aucamville (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 444 days.

(21) Appl. No.: 13/926,133

(22) Filed: Jun. 25, 2013

(65) Prior Publication Data

US 2014/0001309 A1 Jan. 2, 2014

(30) Foreign Application Priority Data

Jun. 27, 2012 (FR) ...................................... 12 56113

(51) Int. Cl.
*B64C 9/02* (2006.01)
*B64C 13/28* (2006.01)
*B64C 3/48* (2006.01)
*B64C 3/50* (2006.01)

(52) U.S. Cl.
CPC . *B64C 13/28* (2013.01); *B64C 3/48* (2013.01); *B64C 3/50* (2013.01); *B64C 9/02* (2013.01); *Y02T 50/44* (2013.01)

(58) Field of Classification Search
CPC .............. B64C 3/48; B64C 3/50; B64C 9/02; B64C 13/28
See application file for complete search history.

(56) References Cited

U.S. PATENT DOCUMENTS

| 5,722,616 | A | 3/1998 | Durand |
| 6,076,767 | A | 6/2000 | Farley et al. |
| 6,467,733 | B1 * | 10/2002 | Young .................. B64C 9/16 244/213 |

FOREIGN PATENT DOCUMENTS

| EP | 0831027 | 3/1998 |
| FR | 2727477 | 5/1996 |

OTHER PUBLICATIONS

French Search Report, May 30, 2013.

* cited by examiner

*Primary Examiner* — Nicholas McFall
(74) *Attorney, Agent, or Firm* — Greer, Burns & Crain, Ltd.

(57) ABSTRACT

A device for mechanically connecting a control surface to a fixed structural element of an aircraft, including a rotary actuator for driving an element that is securely connected to the control surface in rotation in relation to an element securely connected to the fixed structural element, around an articulation axis, as well as articulation elements for articulating this control surface around this axis. These articulation elements are able to support the control surface independently of the rotary actuator. This arrangement permits taking benefit from the advantageous properties of rotary actuators while allowing removal of the rotary actuator without having first to remove the control surface.

14 Claims, 12 Drawing Sheets

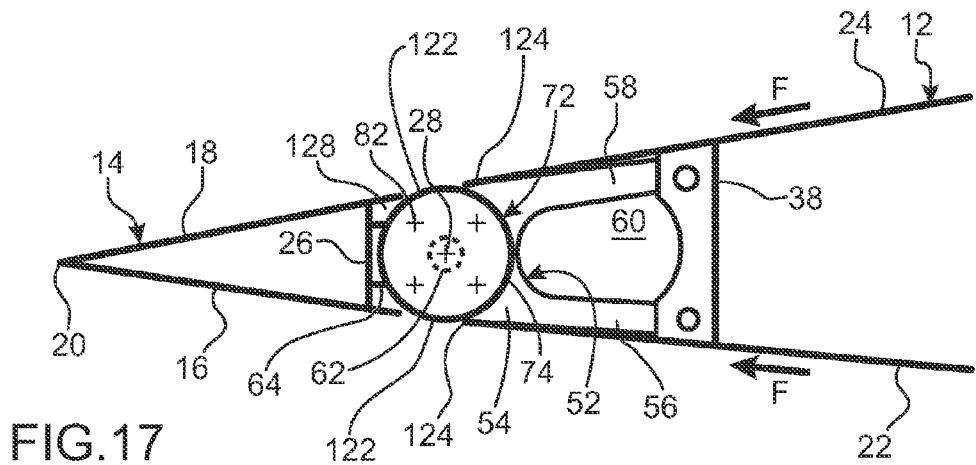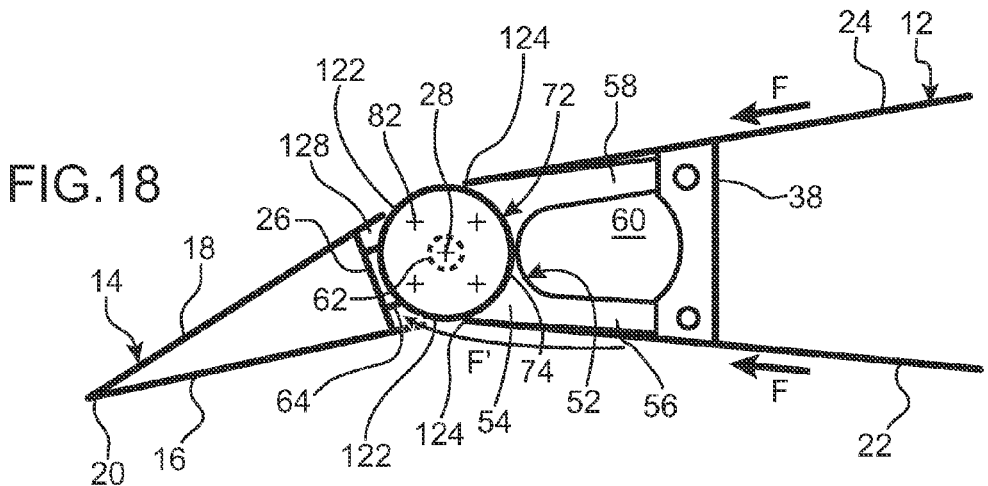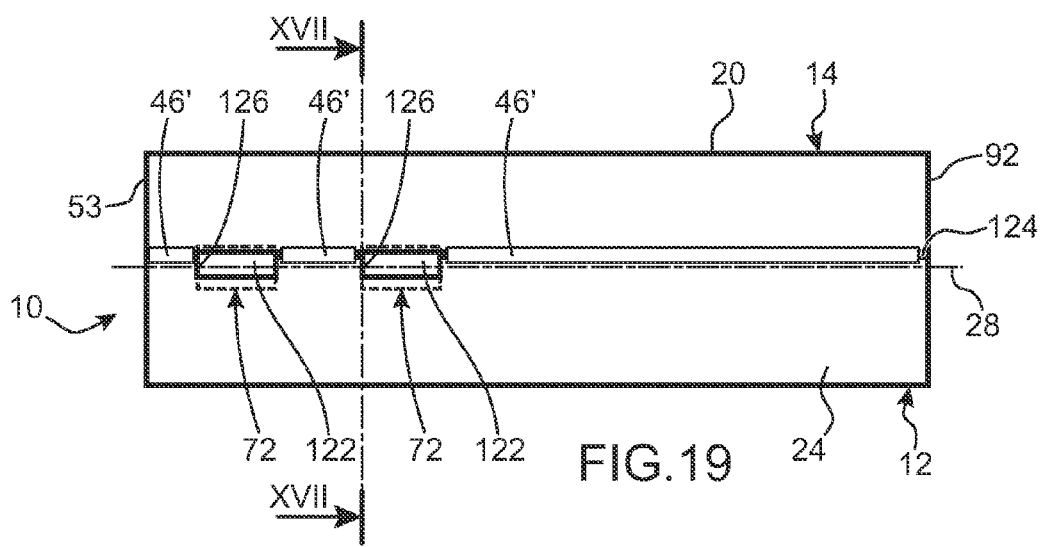

DEVICE FOR MECHANICAL CONNECTION OF A CONTROL SURFACE TO A FIXED STRUCTURAL ELEMENT OF AN AIRCRAFT AND AIRCRAFT WING ELEMENT EQUIPPED WITH SAID DEVICE

CROSS-REFERENCES TO RELATED APPLICATIONS

This application claims the benefit of the French patent application No. 12 56113 filed on Jun. 27, 2012, the entire disclosures of which are incorporated herein by way of reference.

BACKGROUND OF THE INVENTION

The present invention relates to a device for mechanical connection of a control surface to a fixed structural element of an aircraft.

It relates in particular to articulation and operating means of a control surface on a fixed structural element of a wing element of an aircraft.

In this respect, throughout this description the term "wing element" means any aerodynamic bearing surface of an aircraft, such as a principal wing, or a horizontal or vertical tailplane.

The invention also relates to such a wing element of an aircraft, and an aircraft equipped with same.

A wing element overall has two aerodynamic surfaces which join both at the level of the leading edge and also at the level of the trailing edge of the element.

Such a wing element in general comprises a fixed part attached rigidly to the structure of the fuselage of the aircraft, and a set of mobile elements comprising one or more primary control surfaces and optionally one or more secondary control surfaces.

The fixed part of the wing element is formed from panels forming the aerodynamic surfaces of the element, and an internal structure usually formed by ribs and spars to which the panels are fixed.

Some control surfaces are mounted articulated on the corresponding fixed part of the wing element about an axis of articulation immobile relative to said fixed part. Otherwise expressed, these control surfaces are displaceable according to pure rotation movement relative to the fixed part. These can especially be primary control surfaces such as elevators, rudders, ailerons, or spoiler devices, also called spoilers or airbrakes. These primary control surfaces are connected to the primary flight controls of aircraft and allow the aircraft to maneuver during its different flight phases.

FIG. 1 illustrates highly schematically a rear part of a wing 10 of an aircraft of known type, comprising a fixed part 12 and a primary control surface 14, which is for example an aileron arranged at the trailing edge of the wing 10.

In this example, the control surface 14 comprises two aerodynamic covering walls 16 and 18 joined to each other at the level of the trailing edge 20 of the wing and together forming an acute angle θ so as to prolong respectively the lower wing surface wall 22 and upper wing surface wall 24 of the wing. The control surface 14 also comprises a closing spar 26 arranged near the respective free ends of the two aerodynamic covering walls 16, 18 to which this spar 26 is fixed.

The control surface 14 is mounted articulated on the fixed part 12 by means of hinges (not shown in FIG. 1), which define an axis of articulation 28 of the control surface.

Operating the control surface 14 is ensured by at least one linear jack 30 which can be of pneumatic, hydraulic or electric type. This jack 30 comprises a chassis frame 32 having an end 34 articulated by means of a fork 36 on the rear spar 38 of the wing 10 on which the lower and upper surface walls 22 and 24 of the wing are fixed. The jack 30 also comprises a rod 40 capable of being deployed from the opposite end 42 of the chassis frame 32 and having a free end 43 articulated on a lever 44 connected to the control surface 14. This lever 44 is mounted in rotation about the axis of articulation 28 and with the jack 30 forms a mechanism of crankshaft type for driving the control surface 14 in rotation about the axis of articulation 28 under the effect of displacement in translation of the rod 40 of the jack.

The abovementioned articulations are conventionally of spherical joint type to limit the intensity of parasite moments.

In addition, sealing joints 46 are arranged at the interface between each aerodynamic wall 22, 24 of the fixed part 12 of the wing 10 and the corresponding aerodynamic covering wall 16, 18 of the control surface 14 to limit aerodynamic losses at this level. Each of these joints 46 is fixed to the fixed part 12 so as to be free to slide along the corresponding aerodynamic covering wall 16, 18 of the control surface.

As is shown in FIG. 1, the free end 48, 50 of each aerodynamic covering wall 16, 18 is curved towards the interior of the fixed part 12 of the wing 10 to optimize the regularity of the aerodynamic profile of the wing when the control surface is away from its neutral position, and to facilitate the junction between said aerodynamic covering wall 16, 18 and the corresponding joint 46. The curved part of each wall 16, 18 is formed by a deflector attached to this wall, for example.

But there are disadvantages associated with control surface operating devices of the type comprising a linear jack.

In fact, these mechanisms involve considerable linear operating forces. These forces must be absorbed by the structure of the fixed part of the wing and by the structure of the control surface, which also results in increase in the dimensions and the mass of these structures.

Yet, growing demands for reduction in fuel consumption are compelling aircraft manufacturers to reduce both the weight of future units as well as their drag coefficient, especially by decreasing the thickness of the tailplanes and main wings, to the detriment of the volume available for devices provided for operating the control surfaces.

In addition, increasing operating speeds of the control surfaces made preferable by the development of pilotage laws of aircrafts causes an increase in the required volume of the jacks, which all the more complicates integration of linear jacks within the tailplanes and main wings.

In addition, mechanisms of crankshaft type require articulations, especially comprising spherical joints, for satisfactory operation of this type of mechanism. These articulations contribute to volume, mass and complexity of installation of linear jacks. Similarly, since these articulations are the seat of relative movements during operating of the control surfaces, these articulations are sometimes sources of breakdowns and need regular maintenance to control and re-lubricate them. Requirements for reduction in maintenance costs are encouraging aircraft manufacturers to minimize the number and duration of maintenance tasks. This aim also makes preferable to simplify the operations of assembling and disassembling jacks or actuators dedicated to rotationally driving control surfaces.

In addition, where electrical linear jacks are used, the arrangement of bailers on the aerodynamic surface of the wing element may be required to direct part of the air flowing along the wing element towards the jack so as to limit the risk of overheating of this jack.

These scoops however cause considerable loss of aerodynamic efficacy reflected in overconsumption of fuel.

Patent application FR 2 727 477 A1 proposes a device for operating a control surface comprising a rotary hydraulic actuator and in part rectifies the problems of bulk described hereinabove.

A disadvantage of the solution proposed in this document is that the rotary actuator absorbs the structural forces caused by the aerodynamic load exerted on the control surface. As a consequence this requires an increase in the dimensioning of the actuator and the frequency and extent of maintenance operations needed to verify the status of this actuator.

Also, disassembling of the rotary actuator, especially in light of such maintenance operations, requires prior removal of the control surface supported by the actuator as well as final reassembling of the latter, such that the duration and cost of these maintenance operations are increased.

SUMMARY OF THE INVENTION

The aim of the invention especially is to provide a solution which is simple, economic and efficacious for the problem of articulation and operating of control surfaces, which avoids the abovementioned disadvantages at least in part.

For this purpose it proposes a device for mechanical connection of a control surface to a fixed structural element of an aircraft, comprising articulation means of the control surface to said fixed structural element according to an axis of articulation, as well as driving means for driving the control surface in rotation relative to said structural element about said axis of articulation, said driving means comprising at least one rotary actuator comprising a chassis frame and an output member displaceable in rotation about an output axis of the actuator relative to the chassis frame.

According to the invention, said driving means comprise first detachable means for rotationally securing the chassis frame of the actuator to a first element of the control surface and said fixed structural element, said first detachable means being designed to align the output axis of the actuator on said axis of articulation, as well as second detachable means for rotationally securing said output member of the actuator to a second element of the control surface and said structural element.

Also, said articulation means are separate from the rotary actuator and are designed to be able to support the control surface independently of the actuator.

The control surface can be any type, and can in particular be a primary flight control surface mounted to rotate about an axis of articulation fixed relative to the structure of the aircraft. It can be an elevator, a rudder, an aileron, or a spoiler, also called airbrake.

The fixed structural element can especially form part of the structure of a vertical or horizontal stabilizer of a tailplane or form part of the structure of a principal wing.

This structural element takes the form of a spar, for example.

In general, the invention drives in rotation a control surface of an aircraft by means of one or more rotary actuators which can be disassembled particularly simply and rapidly.

The use of rotary actuators especially reduces the bulk of the drive means of control surfaces in a direction orthogonal to the axis of articulation of the control surfaces.

For a determined available volume, the invention offers possibilities for optimizing the arrangement of the drive means of control surfaces, accordingly boosting the operating speed of these drive means.

The use of rotary actuators also limits, or optionally avoids, the use of mobile articulations, that is, those comprising elements which are moved relative to each other under the effect of the kinematics of the drive means of control surfaces.

The possibilities for simple and rapid disassembling of rotary actuators result especially due to the fact that the articulation means can continue to support the control surface even after disassembling of the actuators. The latter can therefore be disassembled without prior removal of the control surface.

Also, the abovementioned rotary actuator or rotary actuators is preferably of electrical type, but can be other type without departing from the scope of the invention.

Electrical actuator should be understood as any type of actuator capable of converting electric power into mechanical power. This can be in particular an electromechanical actuator or an electro-hydrostatic actuator.

Said articulation means preferably comprise at least one pivot shaft on which at least one element of the control surface and said structural element is mounted in rotation.

This pivot shaft defines said axis of articulation.

Also, said articulation means advantageously comprise means for rotationally connecting the pivot shaft to the other element of the control surface and said structural element.

Said driving means preferably comprise coupling means for coupling the output member of the actuator to said pivot shaft.

The term "coupling" should be understood as involving rotationally securing the output member of the actuator and the pivot shaft.

In this case, the pivot shaft therefore enables transmission of a rotation movement from the output member to said other element of the control surface and said structural element.

It should be noted that said means for rotationally connecting the pivot shaft to the other abovementioned element are in this case also part of the abovementioned driving means.

As a variant, and as will appear more clearly hereinbelow, said driving means can comprise centering means for centering the output member relative to the pivot shaft, wherein said centering means leave this member free to rotate relative to said shaft.

Said driving means can advantageously comprise means for mechanical connection of said second element to an eccentric part of said output member of the rotary actuator, said eccentric part being eccentric relative to said output axis of the actuator.

These mechanical connection means can be a substitute for the abovementioned coupling means or, where necessary, complete the latter.

The output member of the actuator preferably comprises a lever comprising said eccentric part of this output member.

The eccentric part of said output member comprises for example an engagement element for engaging a pin connected to said second element for rotationally securing this second element to the output member. As a variant, this configuration can be reversed.

In general, the chassis frame of said rotary actuator advantageously takes the form of a cylinder having an axis parallel to said output axis of the actuator.

In this case, said first detachable means advantageously comprise means for fastening a transversal end wall of the actuator to said first element.

The output member of the actuator preferably extends opposite this transversal end wall, or as a variant, through a circumferential lateral slot made in a cylindrical wall of the chassis frame.

As a variant, said first detachable means can comprise means for fastening a lateral wall of the actuator to said first element.

This lateral wall may take the form of a mounting plate attached to the chassis frame of the actuator or made in a single piece with this chassis frame, for example.

The invention also relates to a wing element for an aircraft, such as a wing or a tailplane, comprising a fixed structural element designed to be fixed to the structure of an aircraft, and at least one control surface displaceable in rotation relative to said fixed structural element.

According to the invention, the wing element comprises at least one device for mechanical connection of said control surface to said fixed structural element of the type described hereinabove.

The chassis frame of each said rotary actuator of said device for mechanical connection preferably takes the form of a cylinder of revolution extending tangentially to an external aerodynamic surface of said wing element.

Otherwise expressed, part of said chassis frame preferably fits into the aerodynamic external surface of the wing element and when operating is therefore washed by the air flow flowing along the wing element.

This results in improvement in cooling, and therefore limitation of the risk of overheating, of each rotary actuator.

As a variant or in addition, said device for mechanical connection can comprise a thermal dissipation element in contact with the chassis frame of each said rotary actuator of the device, or made in a single piece with said chassis frame, and having at least one external surface fitting into an external aerodynamic surface of the wing element.

During operation, the external surface of the thermal dissipation element is consequently washed by the air flow flowing along the wing element.

As a variant, the chassis frame of the actuator can be substantially isolated from the external air flow washing the wing element, without departing from the scope of the invention.

The invention further relates to an aircraft, comprising at least one wing element of the type described hereinabove.

BRIEF DESCRIPTION OF THE DRAWINGS

The invention will be more clearly understood, and other details, advantages and characteristics of the latter will emerge from the following description made by way of non-limiting example and in reference to the attached drawings, in which:

FIG. 17 is a view similar to FIG. 1, illustrating a rear portion of an aircraft wing equipped with an aileron and according to a seventh preferred embodiment of the invention, the aileron being shown in a neutral position;

FIG. 18 is a view similar to FIG. 17, in which the aileron is moved out of its neutral position;

FIG. 19 is a top plan view of the aircraft wing rear portion of FIG. 17;

In all these figures, identical reference numerals can designate identical or similar elements.

DETAILED DESCRIPTION OF THE PREFERRED EMBODIMENTS

Figure 1:
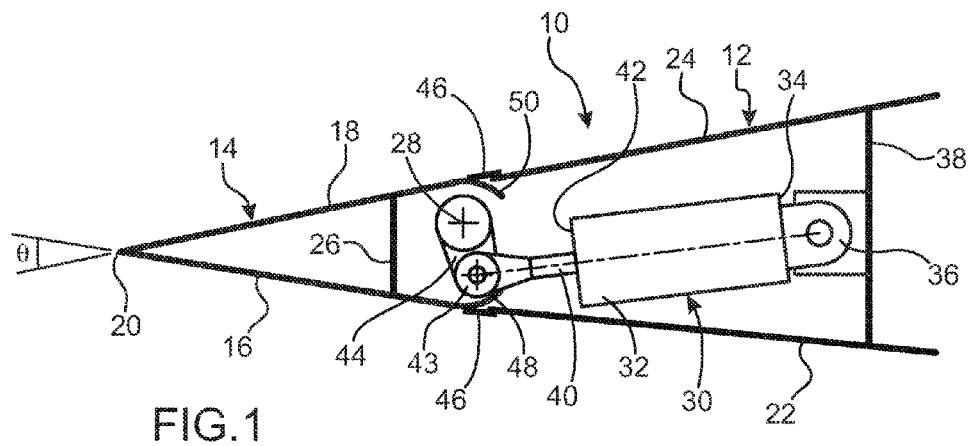
FIG. 1, already described, is a schematic view of a rear portion of an aircraft wing equipped with an aileron of known type, in section according to a plane orthogonal to the direction of the trailing edge of the wing, this figure in particular illustrating the articulation and operating means of the aileron.
Figure 2:
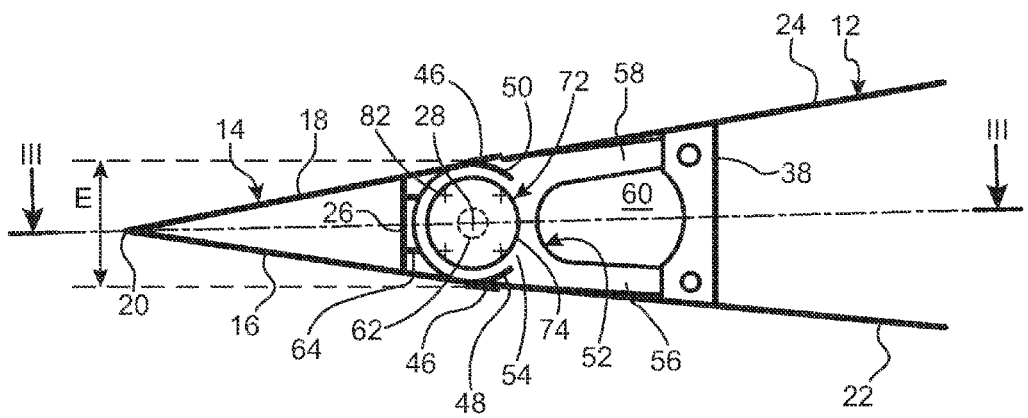
FIG. 2 is a similar view of a rear portion of an aircraft wing equipped with an aileron and according to a first preferred embodiment of the invention, in section according to the plane II-II of FIG. 3.

FIG. 2 illustrates a rear portion of a wing 10 of an aircraft according to a first preferred embodiment of the invention, and represents in particular a rear portion of the fixed part 12 of this wing comprising the rear spar 38 attached to the lower wing surface wall 22 and upper wing surface wall 24, and an aileron 14 of the wing overall similar to the aileron of the wing of FIG. 1 described hereinabove.

The wing 10 according to this first embodiment differs from the wing of FIG. 1 essentially by the aileron 14 which is mechanically connected to the fixed part 12 of the wing.

This mechanical connection is ensured by a device 51 comprising two articulation and operating subassemblies 51a, arranged near a first longitudinal end 53 of the aileron 14, the constitutive elements of which will now be described, as well as two articulation subassemblies 51b which will be described subsequently.

Each of these articulation and operating subassemblies 51a comprises a support element 52 extending according to the plane of FIG. 2 and having overall for example the form of a U with concavity turned in the direction opposite the trailing edge 20. More precisely, the support element 52 comprises a control surface articulating part 54, from which extend a lower leg 56 and an upper leg 58, whereof the free respective ends are connected to the rear spar 38 of the fixed part 12 of the wing to ensure slotting connection of the support element 52 with the rear spar 38. The two legs 56 and 58 jointly define a space 60 beyond the abovementioned control surface articulating part 54.

Figure 3:
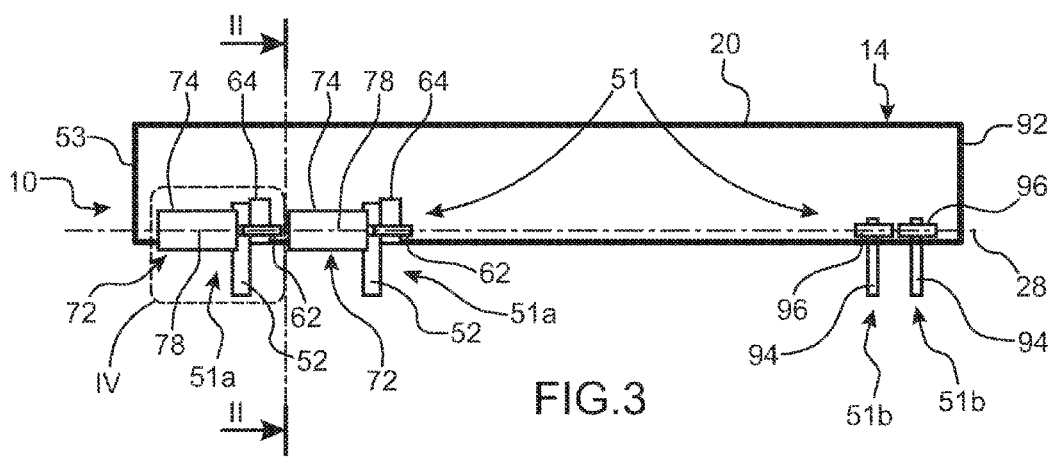
FIG. 3 is a partial schematic view of the aircraft wing rear portion of FIG. 2, in section according to the plane III-III of this FIG. 2.
Figure 4:
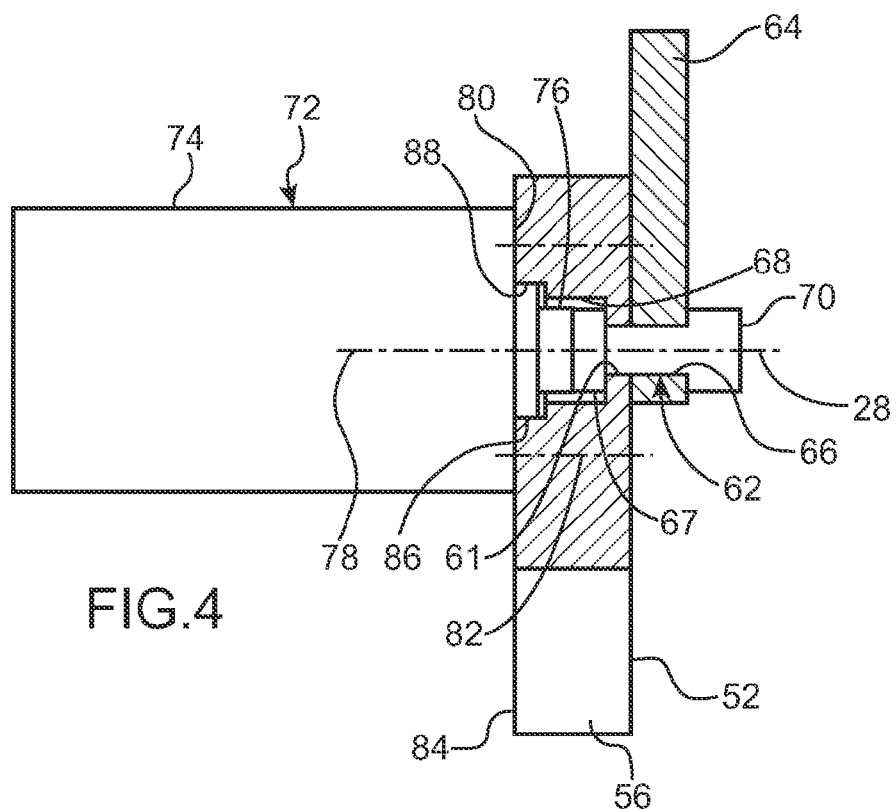
FIG. 4 is an enlarged view of the detail IV of FIG. 3, illustrating a rotary actuator coupled to articulation means of the aileron.

The control surface articulating part 54 of the support element 52 comprises a through-hole 61 (FIG. 4) in which a pivot shaft 62, visible in FIGS. 3 and 4, is mounted in rotation. This pivot shaft 62 is connected rotationally to a control surface fitting 64 and passes through an orifice 66 of said control surface fitting 64. The control surface fitting 64 is connected to the structure of the aileron 14, for example by being fixed to the closing spar 26 of the aileron (FIG. 2). The pivot shaft 62 accordingly defines the axis of articulation 28 of the aileron 14 on the fixed part 12 of the wing.

As is evident in FIG. 4, the pivot shaft 62 comprises a first retention means 67 which is arranged at the end of the pivot shaft located to the side of the support element 52, and which is engaged in a first counterbore 68 made in this support element 52. The pivot shaft 62 comprises second retention means 70 arranged to the side of the control surface fitting 64 and applied to this fitting 64. One 67 of the retention means 67 and 70 of the pivot shaft 62 is for example constituted by a head secured to this pivot shaft, whereas the other retention means 70 takes the form of a nut, for example.

The rotationally securing of the pivot shaft 62 to the control surface fitting 64 can be operated by any type of process, for example by cooperation of form between the retention means 70 and the surface of the control surface fitting 64 to which these retention means are applied, or again by cooperation of form between the pivot shaft 62 and the bore of the control surface fitting 64 in which this pivot shaft 62 extends, for example by means of complementary ribs formed in said bore and said pivot shaft. These ribs form an example of means for rotationally connecting the pivot shaft 62 to the aileron 14, in the terminology particular to the present invention.

The support element 52, the control surface fitting 64, as well as the pivot shaft 62, jointly form a connecting hinge of the aileron 14 to the fixed part 12 of the wing 10.

The support element 52 and the control surface fitting 64 illustrated in the figures show a particularly simple form for better comprehension of the present description, but these elements can of course be of more robust design without departing from the scope of the present invention. The support element 52 can in particular comprise two portions secured to each other, extending on either side of the control surface fitting 64 to form a female hinge part, in which case the control surface fitting 64 constitutes a male hinge part.

As shown in FIGS. 2 to 4, each of said articulation and operating subassemblies 51a of the device 51 also comprises a rotary actuator 72 of electromechanical type.

This actuator 72 comprises a chassis frame 74 and an output member 76 displaceable in rotation about an output axis 78 of the actuator relative to the chassis frame 74 of the latter (FIG. 4) by motor means (not shown) of the actuator.

The chassis frame 74 of the actuator for example has the shape of a cylinder of revolution, having a longitudinal axis which is the same as the output axis 78 of the actuator. The diameter in transversal cross-section of the chassis frame 74 is less than the distance E between the aerodynamic covering walls 16 and 18 of the aileron 14, measured in a plane which is orthogonal to the plane III-III of FIG. 2 and which contains the trailing edge 20 and the axis of articulation 28. The result is a space between the chassis frame 74 of the actuator on the one hand and the aerodynamic covering walls 16 and 18 on the other hand, especially the free curved ends 48, 50 of the latter.

The output member 76 of the actuator takes the form of an output shaft centered on the abovementioned output axis 78 and extending beyond an end face 80 of the chassis frame 74.

The chassis frame 74 of the actuator 72 is fixed to the support element 52 by means of fixing screws 82, represented in FIGS. 2 and 4 by their respective axes. These fixing screws 82 pass through the support element 52 and each has an end screwed in the abovementioned end face 80 of the chassis frame 74 such that:

this end face 80 is applied to the face 84 of the support element 52 located to the side opposite the control surface fitting 64, the output shaft 76 is applied against the retention means 67 of the pivot shaft 62, and the output axis 78 of the actuator 72 is aligned with the axis of articulation 28 defined by the pivot shaft 62.

The output shaft 76 of the actuator 72 is provided with coupling means to the pivot shaft 62, which can be any type adapted to rotationally securing this output shaft 76 with the pivot shaft 62. These coupling means (not shown in figures) can for example comprise a flat part, or an end pin of polygonal cross-section, capable of being engaged in a recess of complementary shape formed in the retention means 67 provided at the end of the pivot shaft 62.

In the illustrated embodiment, the actuator 72 comprises a base plate 86 (FIG. 4) formed to project on the abovementioned end face 80 and from which the output shaft 76 extends. The base plate 86 is engaged in a second counterbore 88 of complementary cross-section which connects the abovementioned face 84 of the support fitting 52 to the first counterbore 68 in which the first retention means 67 of the pivot shaft 62 extend. The second counterbore 88 connected to the base plate 86 of the actuator 72 makes centering of the output shaft 76 of this actuator easier relative to the pivot shaft 62. The diameter in transversal cross-section of the base plate 86 is greater than that of the output shaft 76 of the actuator, and the diameter in transversal cross-section of the second counterbore 88 is greater than that of the first counterbore 68.

As shown in FIG. 3, the device for mechanical connection 51 also comprises two articulation subassemblies 51b, arranged near the second longitudinal end 92 of the aileron 14, opposite the abovementioned first end 53. Each of these articulation subassemblies 51b takes the form of a hinge of conventional type for example, comprising a male support element 94 (FIG. 3) fixed to the rear spar 38 of the fixed part 12 of the wing, a female fitting (not shown in FIG. 3) fixed to the closing spar 26 of the aileron 14, and a pivot shaft 96 about which the male support element 94 and the abovementioned female fitting are articulated to allow rotation of the aileron 14 relative to the fixed part 12 of the wing about the axis of articulation 28.

It should be noted in the terminology of the present invention that the fixing screws 82 form first detachable means for rotationally securing the chassis frame 74 of each actuator 72 with the support element 52 and therefore with the rear spar 38 of the wing 10. In addition and jointly with the abovementioned coupling means of the output shaft 76 of each actuator 72 to the corresponding pivot shaft 62, these same fixing screws 82 are part of second detachable means for rotationally securing this output shaft 76 to the aileron 14.

During operation, a command for change of position of the aileron 14 results in rotational displacement of the output shaft 76 relative to the chassis frame 74 of each rotary actuator 72, about the associated output axis 78 aligned with the axis of articulation 28 of the aileron 14, causing relative displacement of the corresponding control surface fitting 64 and of the support element 52 in rotation about this axis of articulation 28. The result is rotational displacement of the aileron 14 relative to the fixed part 12 of the wing 10 about the axis of articulation 28.

It should be noted that the chassis frame 74 of each actuator 72 is kept fixed on the support element 52, whereas the output shaft 76 of the actuator is solid in rotation with the control surface fitting 64.

Figure 5:
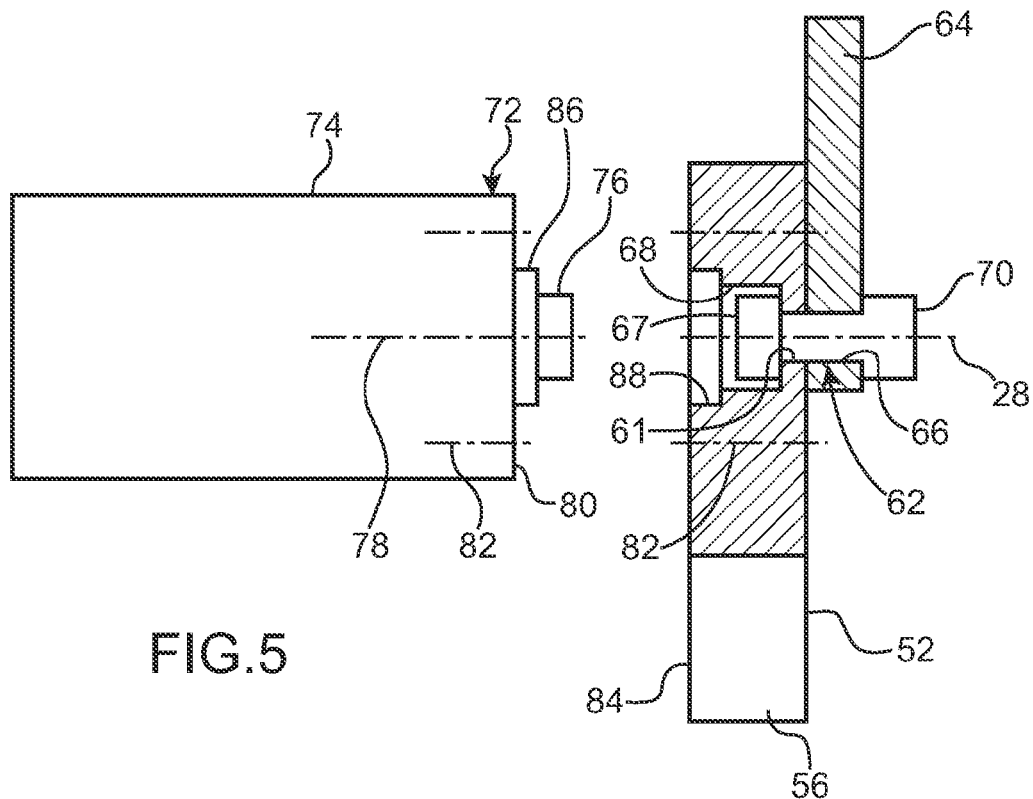
FIG. 5 is a view similar to FIG. 4, in which the rotary actuator is uncoupled from the articulation means of the aileron.

When disassembling of the rotary actuators 72 is planned, for example to conduct maintenance operations relative to these actuators, it suffices to disassemble the fixing screws 82 fastening the chassis frame 74 of each actuator 72 on the corresponding support fitting 52 to withdraw each actuator 72, as illustrated in FIG. 5. According to the diameter of the rotary actuators 72, access to the fixing screws 82 and disengagement of these rotary actuators 72 may require prior disassembling of a panel of the lower wing surface wall 22 and of the deflector forming the free curved end 48 of the corresponding aerodynamic covering wall 16.

An advantage of the device for mechanical connection 51 is that the aileron 14 continues to be supported by the fixed part 12 of the wing 10 even after disassembling of the rotary actuators 72. This is made possible by articulation means which are separate from the actuators 72. In the first preferred embodiment described above, these articulation means comprise the support element 52, the pivot shaft 62 and the control surface fitting 64 associated with each actuator as well as the articulation subassemblies 51b. These articulation means in fact form autonomous assemblies capable of supporting the aileron 14 independently of each rotary actuator 72. Consequently, the actuators 72 can be dismounted particularly simply without the aileron 14 having to be removed.

A similar advantage relative to the ease of disassembling the actuators 72 is common to all the other embodiments which will now be described.

Figure 6:
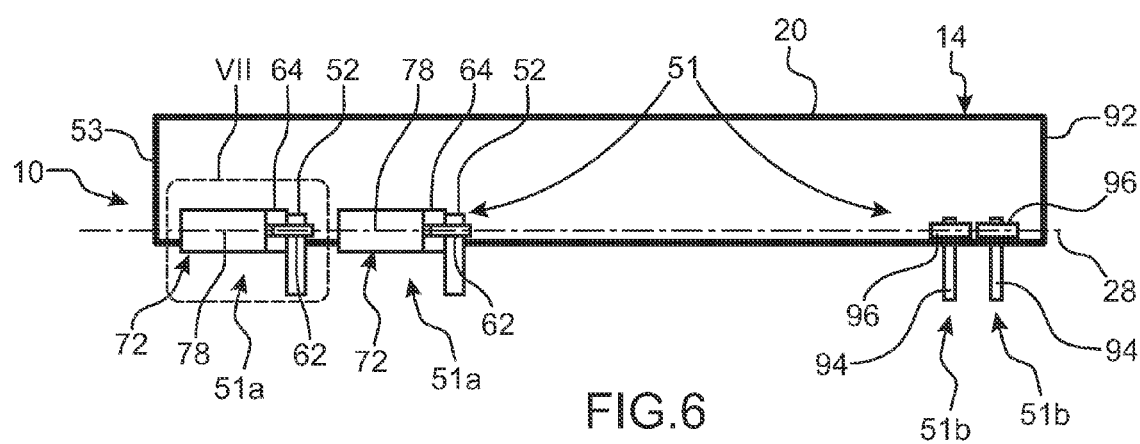
FIG. 6 is a view similar to FIG. 3 of a rear portion of an aircraft wing equipped with an aileron and according to a second preferred embodiment of the invention.
Figure 7:
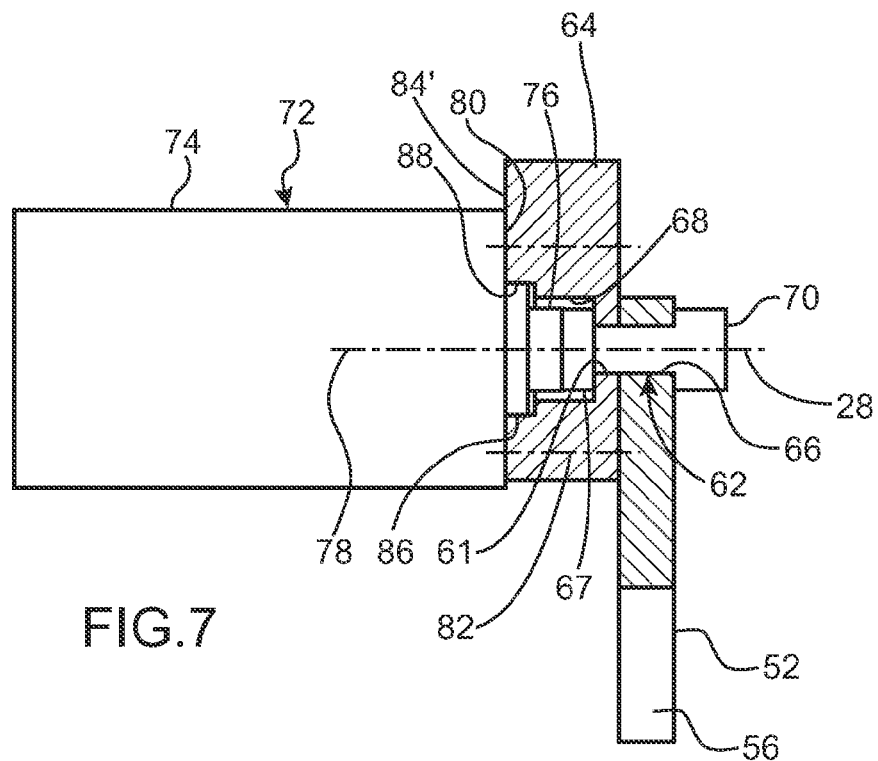
FIG. 7 is an enlarged view of the detail VII of FIG. 6, illustrating a rotary actuator coupled to articulation means of the aileron.
Figure 8:
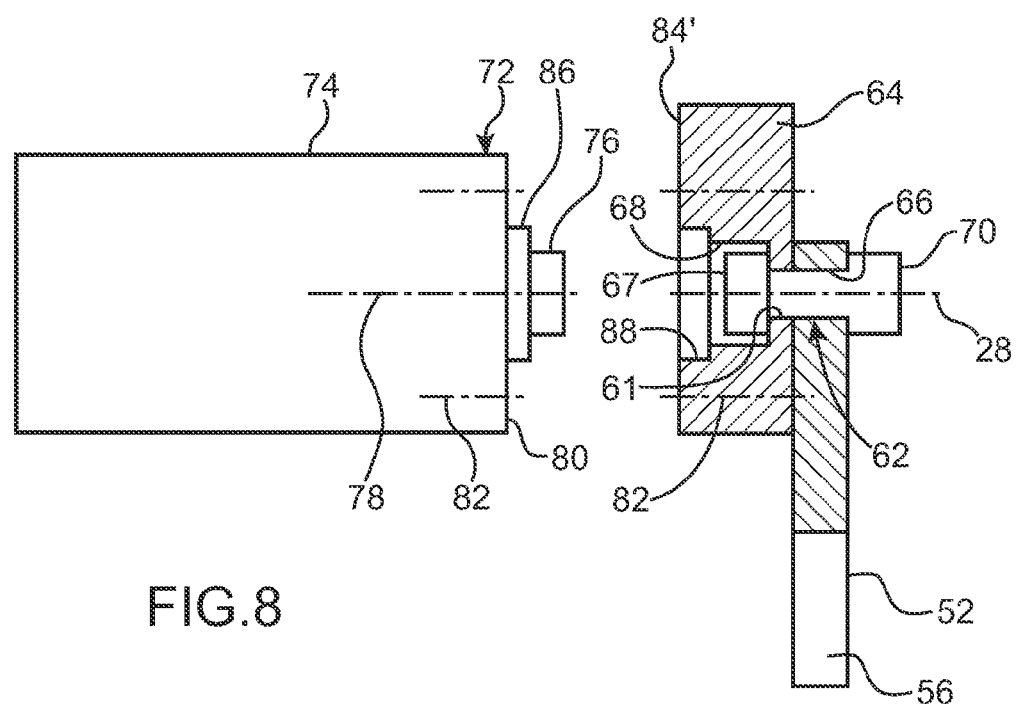
FIG. 8 is a view similar to FIG. 7, in which the rotary actuator is uncoupled from the articulation means of the aileron.

The wing 10 according to the second preferred embodiment of the invention, which is illustrated in FIGS. 6 to 8, differs from the wing according to the first embodiment described hereinabove in that the support element 52 and the control surface fitting 64 of each articulation and operating subassembly 51a have reversed roles vis-à-vis the associated actuator 72.

In this way, the chassis frame 74 of the actuator 72 is fixed to a face 84' of the control surface fitting 64 (FIG. 7), which fitting 64 comprises the passage orifice 61 for the pivot shaft 62 as well as the counterbores 68 and 88 receiving respectively the output shaft 76 of the actuator and the base plate 86 of the latter.

The support element 52 extends on the other side of the control surface fitting 64 relative to the actuator 72 and is solid in rotation with the pivot shaft 62. For this purpose, this pivot shaft 62 and the bore 66 of the support element 52 can comprise ribs designed to cooperate in a form-locking manner.

Also, the first retention means 67 of the pivot shaft 62 are applied to the control surface fitting 64, whereas the second retention means 70 are applied to the support element 52.

By way of analogy with the description of the first embodiment, the support element 52 and the control surface fitting 64 can have a more robust design without departing from the scope of the present invention. In this way, the control surface fitting 64 can in particular comprise two portions secured to each other and extending on either side of the support element 52 to form a female hinge part, in which case the support element 52 forms a male hinge part.

The operation of the wing 10 according to this second embodiment is similar to that of the wing according to the first embodiment described hereinabove. The principal difference with the latter is that in this second embodiment the chassis frame 74 of each actuator 72 is kept fixed on the corresponding control surface fitting 64, whereas the output shaft 76 is solid in rotation with the support element 52.

Figure 9:
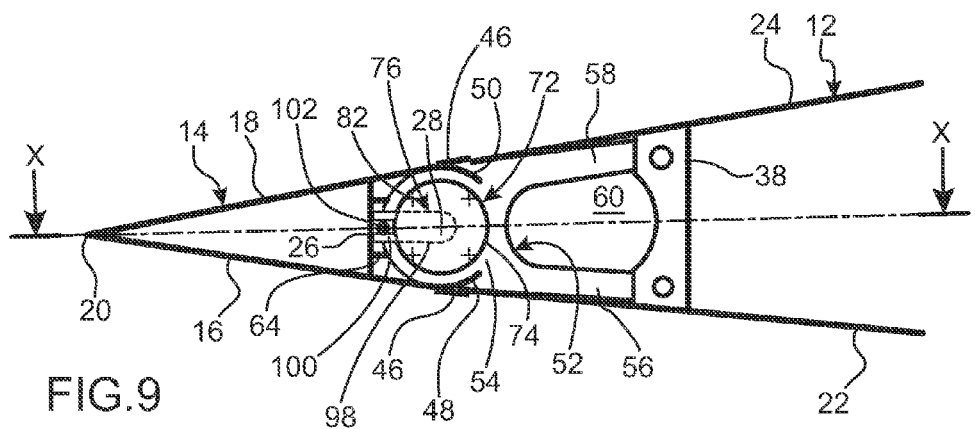
FIG. 9 is a view similar to FIG. 1, illustrating a rear portion of an aircraft wing equipped with an aileron and according to a third preferred embodiment of the invention.
Figure 10:
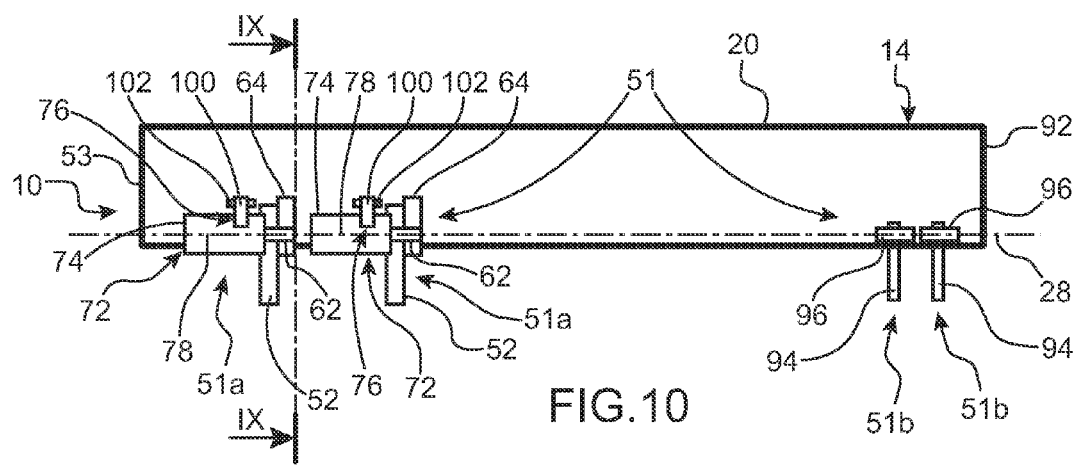
FIG. 10 is a view similar to FIG. 3, illustrating the aircraft wing rear portion of FIG. 9.

In the third preferred embodiment of the invention illustrated in FIGS. 9 and 10, the support element 52 and the control surface fitting 64 of each articulation and operating subassembly 51a are similar to those of the first embodiment described hereinabove, and the chassis frame 74 of the corresponding actuator 72 is also fixed to the support element 52 by means of fixing screws 82 so as to align the output axis 78 of the actuator with the axis of articulation 28 defined by the pivot shafts 62 and by the articulation subassemblies 51b.

However, the pivot shaft 62 of each articulation and operating subassembly 51a is not coupled to an output shaft of the corresponding actuator 72, and the output member 76 of the latter takes the form of a lever extending orthogonally to the output axis 78 of the actuator, and passing for example through a circumferential slot (not shown in figures) made in the chassis frame 74 of this actuator.

The lever 76 has a proximal end 98 extending inside the chassis frame 74 of the actuator 72 and attached to motor means of this actuator, which are capable of driving the lever 76 in rotation about the output axis 78 of the actuator. The opposite distal end of the lever 76 extends outside the chassis frame 74, and is provided with an end fork 100 oriented towards the closing spar 26 of the aileron 14.

Each articulation and operating subassembly 51a also comprises a finger or pin 102 connected to the closing spar 26 of the aileron 14 and engaged in the end fork 100 of the lever 76 of the corresponding actuator 72 such that rotational displacement of the lever 76 induces similar displacement of the aileron 14 about the axis of articulation 28. For this purpose, the finger 102 preferably extends parallel to the axis of articulation 28.

As a variant, the connection between the finger 102 and the lever 76 can be made by means of a more sophisticated articulation, for example of the type to be described hereinbelow in relation to the fourth embodiment of the invention. Also, the configuration can be reversed, that is, the finger 102 can be borne by the lever 76, in which case the articulation and operating subassembly 51a comprises an engagement element connected to the closing spar 26 of the aileron 14 and in which the abovementioned finger 102 is engaged.

By analogy with the first embodiment described hereinabove, the support element 52 and the control surface fitting 64 can be of more robust design without departing from the scope of the present invention, and in particular can form respectively a female part and a male hinge part.

The operation of the wing 10 according to this third embodiment differs from that of the wing according to the first embodiment described hereinabove in that the motor torque induced by each rotary actuator 72 is not transmitted to the aileron 14 via the associated control surface fitting 64 but by the finger 102 driven by the lever of the actuator, whereas the control surface fitting 64 does not participate in driving the aileron 14 in rotation but only in articulation of the latter on the fixed part 12 of the wing.

In the fourth preferred embodiment of the invention illustrated in FIGS. 11 and 12, the support element 52 and the control surface fitting 64 of each articulation and operating subassembly 51a are overall of the same type as in the first embodiment described hereinabove.

Figure 11:
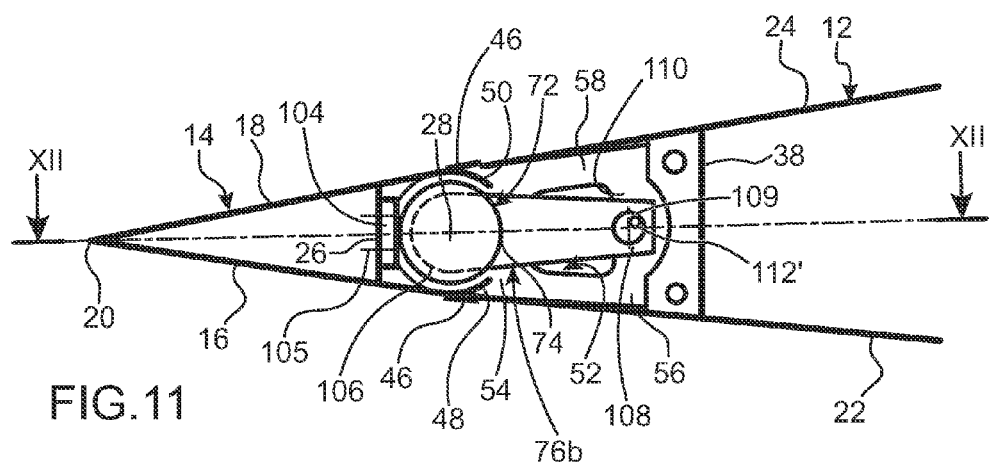
FIG. 11 is a view similar to FIG. 1, illustrating a rear portion of an aircraft wing equipped with an aileron and according to a fourth preferred embodiment of the invention.
Figure 12:
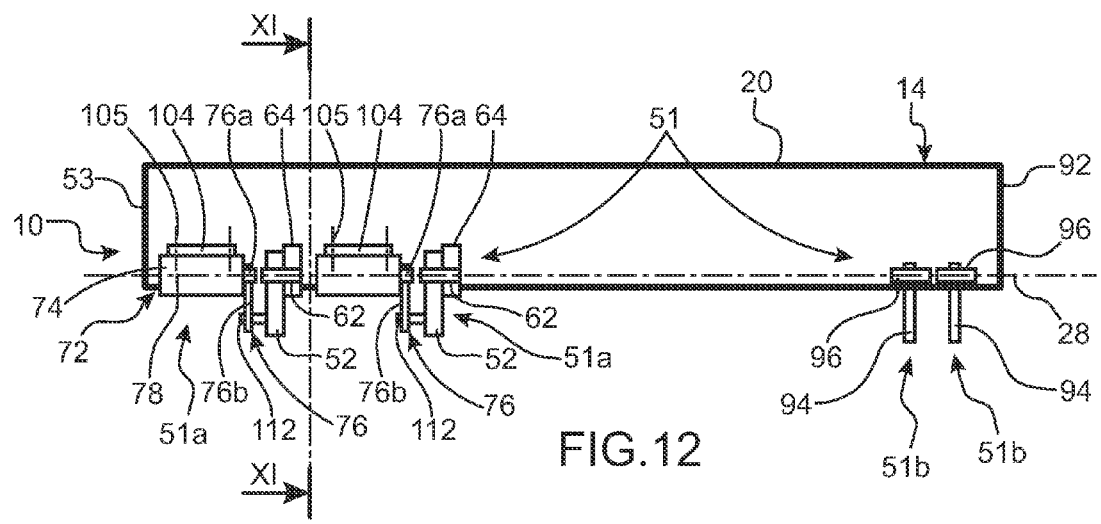
FIG. 12 is a view similar to FIG. 3, illustrating the aircraft wing rear portion of FIG. 11.

However, the chassis frame 74 of each rotary actuator 72 comprises a lateral mounting plate 104 fixed to the closing spar 26 of the aileron 14 by means of fixing screws 105 shown by their respective axes in FIGS. 11 and 12. The chassis frame 74 is fixed to align the output axis 78 of the actuator with the axis of articulation 28 defined by the pivot shafts 62 and by the articulation subassemblies 51b.

The support element 52 has no counterbore equivalent to the second counterbore 88 of FIG. 4. By contrast, this support element 52 can comprise a counterbore similar to the first counterbore 68 of FIG. 4 for receiving a head of the pivot shaft 62 or a nut screwed onto the latter.

The output member 76 of each actuator 72 is solid in rotation with the support element 52 and comprises for example a shaft 76a centered on the axis of articulation 28 (FIG. 12) and connected rotationally to a lever 76b extending orthogonally to said axis of articulation 28 (FIGS. 11 and 12).

The lever 76b comprises a proximal end 106 mounted on the shaft 76a such that the lever 76b is connected rotationally with this shaft 76a, and a distal end 108 provided with an eccentric spherical joint 109. The support element 52 comprises a cross-beam 110 connecting the ends of the legs 56 and 58 opposite the control surface articulating part 54 of this support element 52. The abovementioned cross-beam 110 bears a pin 112' which preferably extends parallel to the axis of articulation 28 and which is engaged in the eccentric spherical joint 109 of the lever 76b.

The eccentric spherical joint 109 transmits actuation forces to the structure while offering a degree of liberty in radial translation relative to the axis of articulation 28 in the connection between the lever 76b and the support element 52. This makes up for manufacturing tolerances and makes assembly of the actuator easier.

The eccentric spherical joint 109 also makes up for deformations of the aileron 14 and maximizes surfaces in contact between the pin 112' and the lever 76b to optimize distribution of actuation forces.

During operation, relative rotational displacement of the shaft 76a and of the chassis frame 74 of each actuator 72 results in rotational displacement of this chassis frame 74, and therefore of the aileron 14, relative to the support element 52 and therefore to the fixed part 12 of the wing, about the axis of articulation 28.

It should be noted that centering of the shaft 76a of each actuator 72 relative to the corresponding pivot shaft 62 is ensured by fixing the chassis frame 74 of the actuator 72 by its lateral mounting plate 104 to the closing spar 26 of the aileron 14.

Optionally, this centering can be jointly ensured by reciprocal engagement between the shaft 76a of the actuator 72 and the corresponding pivot shaft 62. For this purpose, this shaft 76a can comprise an end dog point engaged in an orifice of complementary cross-section provided in the corresponding end of the pivot shaft 62.

Figure 13:
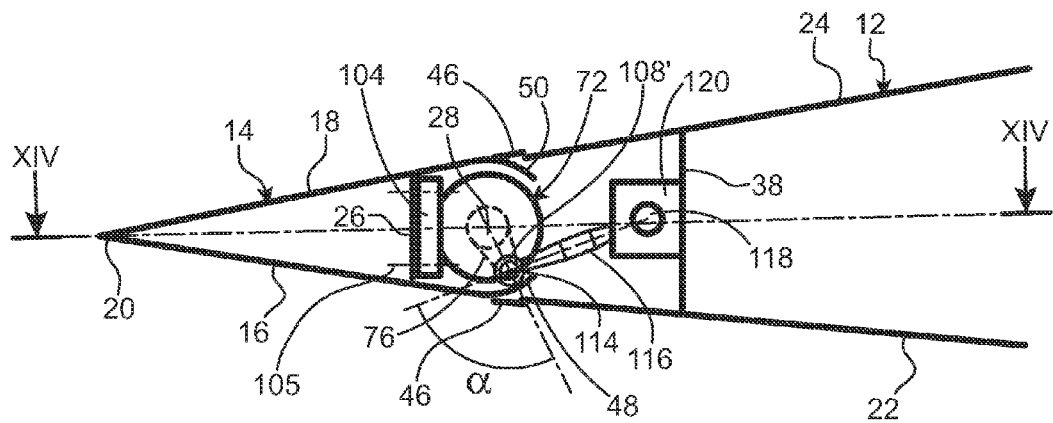
FIG. 13 is a view similar to FIG. 1, illustrating a rear portion of an aircraft wing equipped with an aileron and according to a fifth preferred embodiment of the invention.
Figure 14:
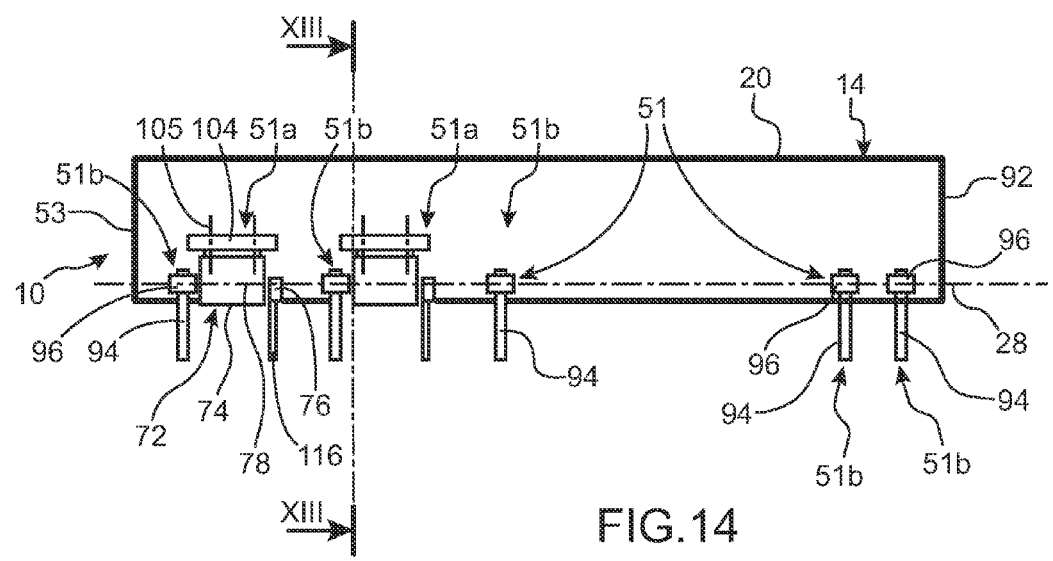
FIG. 14 is a view similar to FIG. 3, illustrating the aircraft wing rear portion of FIG. 13.

In the fifth preferred embodiment of the invention illustrated in FIGS. 13 and 14, the device for mechanical connection 51 comprises two operating subassemblies 51a and five articulation subassemblies 51b which are independent of each other.

Three of the articulation subassemblies 51b are arranged to the side of the first longitudinal end 53 of the aileron 14, whereas the two other articulation subassemblies 51b are arranged to the side of the second longitudinal end 92 of the latter as in the embodiments described hereinabove. The articulation subassemblies 51b of this fifth embodiment are similar to those of the embodiments described hereinabove.

The two operating subassemblies 51a are each inserted between two consecutive articulation subassemblies 51b located to the side of the first longitudinal end 53 of the aileron 14.

Each operating subassembly 51a comprises a rotary actuator 72 provided with a lateral mounting plate 104 fixed to the closing spar 26 of the aileron 14, as in the fourth embodiment described hereinabove, so as to align the output axis 78 of the actuator with the axis of articulation 28 defined by the articulation subassemblies 51b.

The output member 76 of the actuator 72 takes the form of a lever connected rotationally with a drive shaft of the actuator 72 (not shown in the figures) and extending orthogonally to the output axis 78 of the actuator 72. The lever 76 comprises a proximal connecting end 106 connected to said drive shaft, and a distal end 108' fixed to an end 114 of a connecting rod 116 whereof the other end 118 is mounted fixed in a fork 120 connected to the rear spar 38 of the fixed part 12 of the wing. The lever 76 and the connecting rod 116 together preferably form an angle α close to 90 degrees.

During operation, the drive shaft of each actuator 72 is kept fixed by the lever 76 and the connecting rod 116, such that relative displacement in rotation of this drive shaft and of the chassis frame 74 of each actuator induces displacement of this chassis frame 74, and therefore of the aileron 14, in rotation about the axis of articulation 28.

It should be noted that connections of the connecting rod 116 to the lever 76 on one hand and to the fork 120 on the other hand are not made mobile in the actuation kinematics of the control surface such that these connection can be ensured by means of relatively less bulky components. The resulting assembly can be of relatively less bulk and mass relative to devices of known type, and is also particularly simple and reliable.

Figure 15:
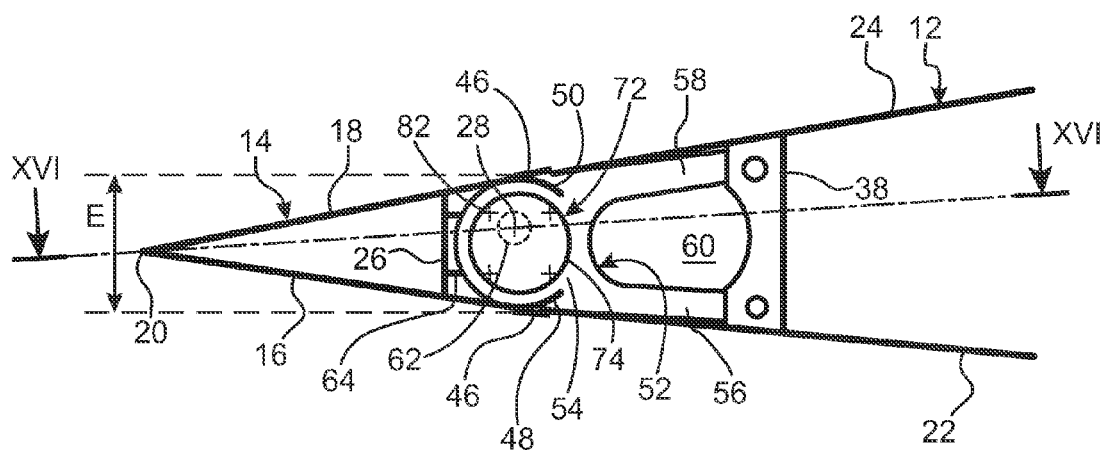
FIG. 15 is a view similar to FIG. 1, illustrating a rear portion of an aircraft wing equipped with an aileron and according to a sixth preferred embodiment of the invention.
Figure 16:
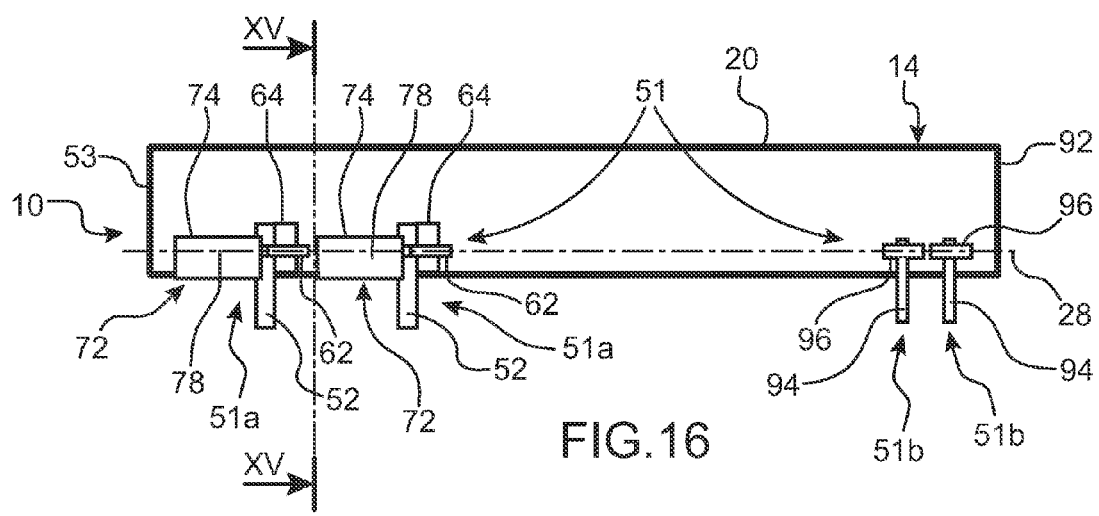
FIG. 16 is a view similar to FIG. 3, illustrating the aircraft wing rear portion of FIG. 15.

In the sixth preferred embodiment of the invention illustrated in FIGS. 15 and 16, the device for mechanical connection 51 is similar to that of the first embodiment of FIGS. 2 and 3, except in that the output axis 78 of each actuator 72 is eccentric relative to the axis of revolution of the chassis frame 74 of the actuator.

This configuration can utilize actuators comprising other types of internal mechanisms.

In the seventh preferred embodiment of the invention illustrated in FIGS. 17 to 19, the wing 10 is similar to that of the first embodiment of FIGS. 2 and 3, but differs from the latter due to the fact that:

the chassis frame 74 of each rotary actuator 72 has a diameter such that this chassis frame is tangential to the external aerodynamic surface of the wing defined by the lower wing surface wall 22 and upper wing surface wall 24 of the fixed part 12 and by the aerodynamic covering walls 16 and 18 of the aileron 14; and at the level of each actuator 72, the wing 10 is devoid of sealing joints between each aerodynamic wall 22, 24 of the fixed part 12 and the corresponding aerodynamic covering wall 16, 18 of the aileron 14.

In this way, a part 122 of the chassis frame 74 of each actuator 72 fits into the external aerodynamic surface of the wing 10 and is therefore washed by the air flow F along the abovementioned aerodynamic walls to contribute to cooling of the actuator.

For this purpose, the rear edge 124 of each aerodynamic wall 22, 24 of the wing 10 can comprise notches 126 (FIG. 19), each intended for passage of the chassis frame 74 of a corresponding actuator 72.

Part F' of the abovementioned air flow F (FIG. 18) can optionally be allowed to penetrate the space 128 delimited by the aerodynamic covering walls 16 and 18 of the aileron 14 and by the chassis frame 74 of each actuator 72 so as to further improve cooling of the actuator.

As shown in FIG. 19, the wing 10 however comprises sealing joints 46' arranged laterally on each side of the parts 122 of the chassis frame 74 which fit into the external surface of the wing 10 to create a join between each aerodynamic wall 22, 24 of the fixed part 12 and the wall of the corresponding aerodynamic coating 16, 18 of the aileron 14.

The cooling principle of the actuators 72 proposed in this seventh embodiment can of course be applied to all the embodiments of the invention described hereinabove.

Figure 20:
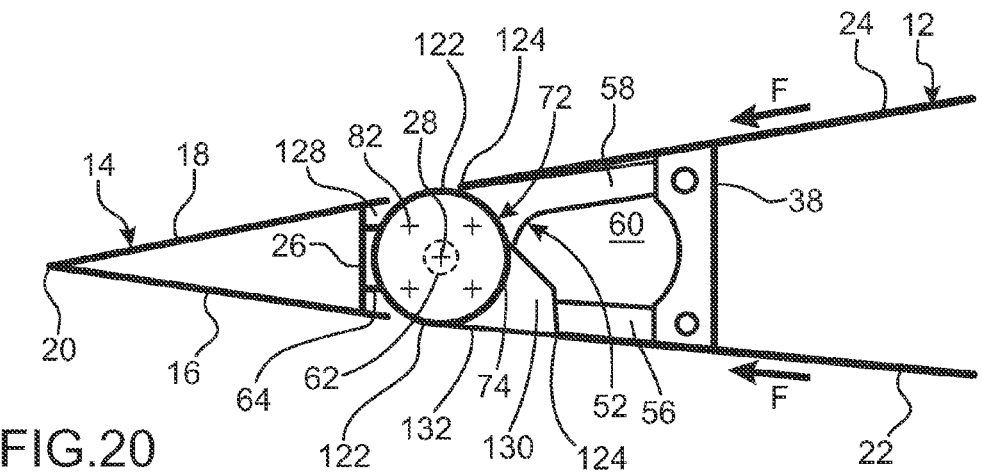
FIG. 20 is a view similar to FIG. 1, illustrating a rear portion of an aircraft wing equipped with an aileron and according to an eighth preferred embodiment of the invention.
Figure 21:
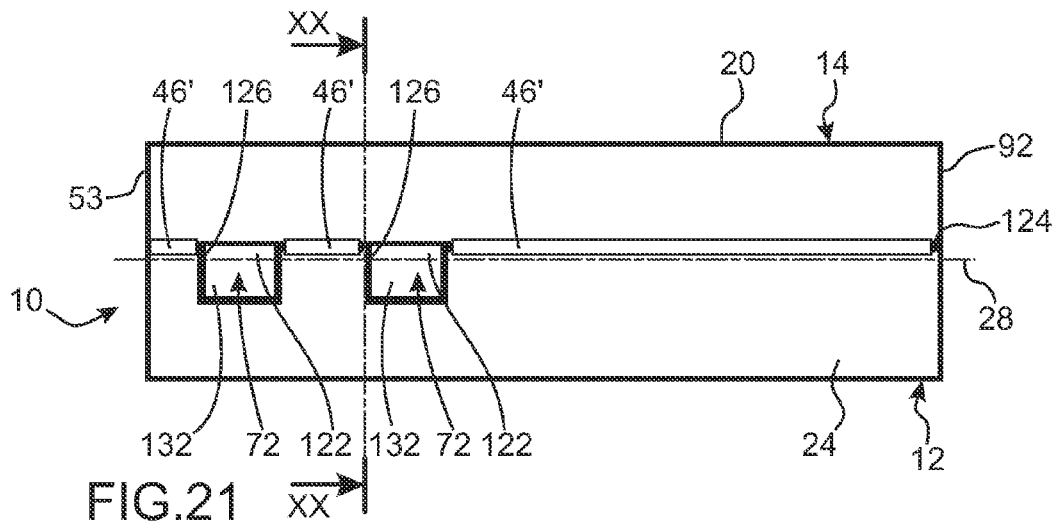
FIG. 21 is a bottom plan view of the aircraft wing rear portion of FIG. 20.

In the eighth preferred embodiment of the invention illustrated in FIGS. 20 and 21, the wing 10 is similar to that of the seventh embodiment of FIGS. 17 to 19, but differs from the latter due to the fact that the device for mechanical connection 51 comprises two thermal dissipation elements 130 respectively in contact with the chassis frame 74 of each rotary actuator 72, and having each an external surface 132 which prolongs the lower wing surface wall 22 of the fixed part 12 of the wing and which fits into the external aerodynamic surface of the wing.

Each thermal dissipation element 130 can be attached to the corresponding chassis frame 74, or be made in a single piece with the latter.

The thermal dissipation elements 130 augment the surface of thermal exchange between the chassis frame 74 of each actuator 72 and the external air flow F.

Figure 22:
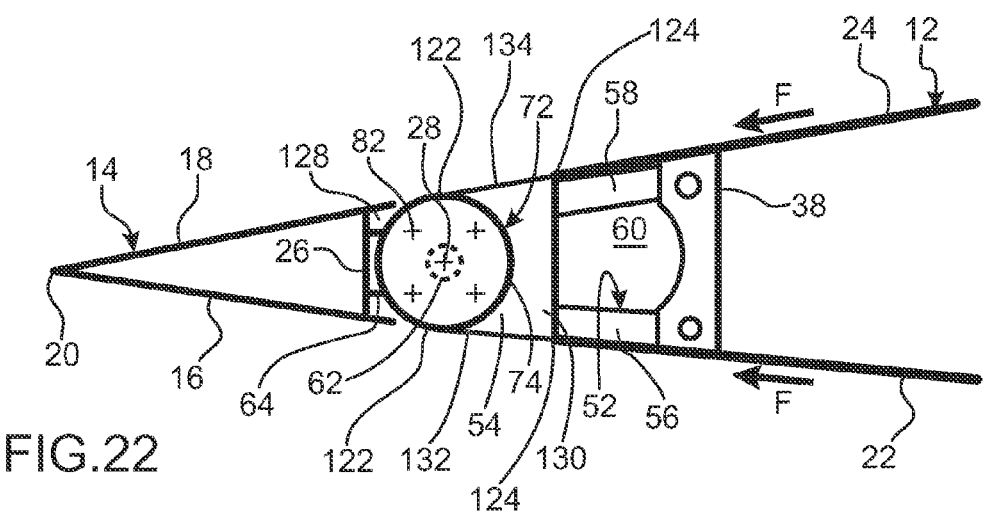
FIG. 22 is a view similar to FIG. 1, illustrating a variant embodiment of the aircraft wing rear portion according to the eighth preferred embodiment of the invention.

As a variant, each thermal dissipation element 130 can also have an external surface 134 which prolongs the upper wing surface wall 24 of the wing 10 so as to also fit into the external aerodynamic surface of the wing 10, as illustrated in FIG. 22.

In the ninth embodiment of the invention described in FIGS. 23 and 24, the cooling principle of the actuators 72 propose in the seventh embodiment described hereinabove is transposed to the case where the chassis frame 74 of each actuator 72 is fixed to the control surface fitting 64 and is solid in rotation with the aileron 14 and not the support element 52, whereas the output member of each actuator 72 is secured in rotation to the support element 52, for example by means of the pivot shaft 62 as in the first embodiment of FIGS. 2 and 3.

Also, the fixed part 12 of the wing 10 comprises, fixed to each of its aerodynamic walls 22 and 24, a sealing joint 46 extending substantially over the entire length of the aileron 14 to block the space between the relevant aerodynamic wall 22, 24 and the chassis frame 74 of each actuator 72.

The sealing joints 46 optimize aerodynamic performances of the wing 10 without considerably penalizing the cooling of the actuators 72. This cooling is in fact effectively ensured due to the fact that when these actuators 72 are stressed to hold the aileron 14 in a deflected position, a portion 135 of the external surface of the chassis frame of each actuator 72 is revealed and is therefore washed by the external air flow F.

Figure 23:
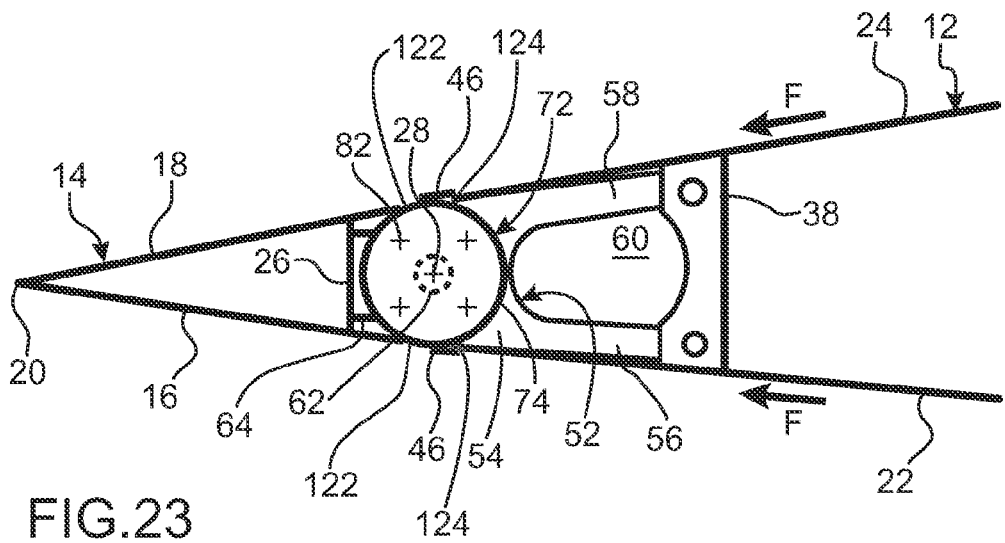
FIG. 23 is a view similar to FIG. 1, illustrating a rear portion of an aircraft wing equipped with an aileron and according to a ninth preferred embodiment of the invention, in which the aileron is in a neutral position.
Figure 24:
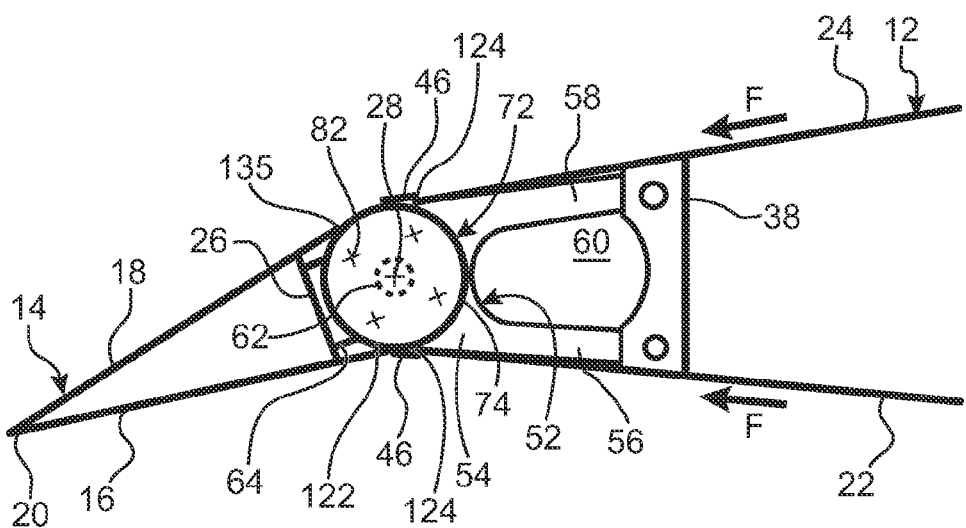
FIG. 24 is a view similar to FIG. 23, in which the aileron is in a deflected position.
Figure 25:
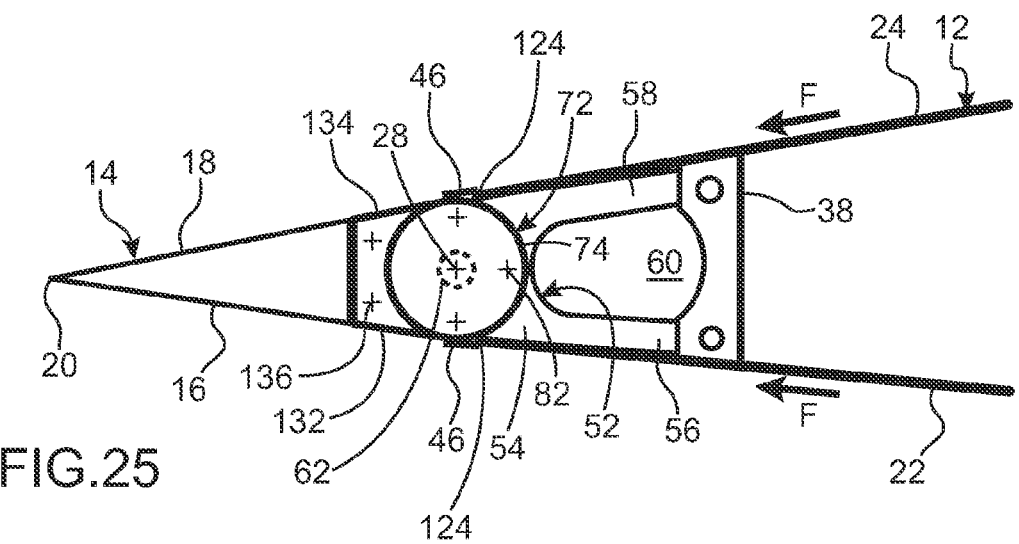
FIG. 25 is a view similar to FIG. 1, illustrating a rear portion of an aircraft wing equipped with an aileron and according to a tenth preferred embodiment of the invention.
Figure 26:
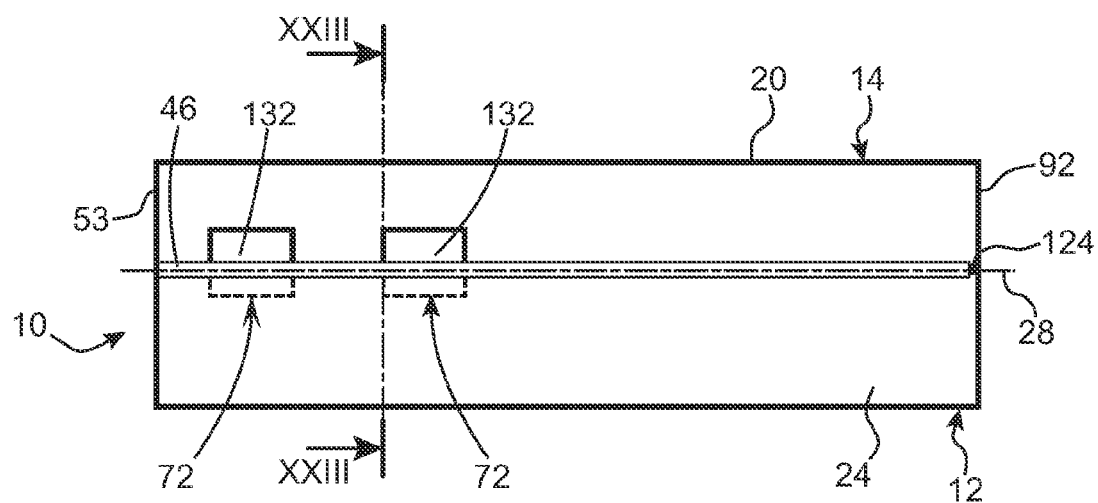
FIG. 26 is a top plan view of the aircraft wing rear portion of FIG. 25.

In the tenth preferred embodiment of the invention illustrated in FIGS. 25 and 26, the wing 10 is similar to that of the ninth embodiment of FIGS. 23 and 24, but differs from the latter due to the fact that the chassis frame 74 of each rotary actuator 72 is provided with a thermal dissipation element 130' which is secured to the closing spar 26 of the aileron 14 by means of fixing screws 136 shown by their respective axes in FIG. 25. In the example illustrated, the thermal dissipation element 130' has two external surfaces 132 and 134 which respectively prolong the aerodynamic covering walls 16 and 18 of the aileron 14 so as to fit into the external aerodynamic surface of the wing.

The thermal dissipation element 130' of each actuator 72 augments the cooling of the actuator by contact of the external surfaces 132, 134 of the thermal dissipation element 130' with the external air flow F.

In general, integration of rotary actuators into the hinge of the control surfaces especially frees up the space between the rear spar 38 of the wing 10 and the axis of articulation 28, and brings together these 2 elements to resolve the problems of bulk posed by the refining of the wing elements such as wings and tailplanes. In the same way, integration of rotary actuators reduces the mass of the drive means of control surfaces, as well as the mass of the surrounding structure, and overall increases the reliability of the means articulating and operating control surfaces.

In all the embodiments described hereinabove, the invention is applied to the articulation and operating of an aileron 14 of a principal wing 10 of an aircraft, but the preceding ideas can of course be applied to any other type of control surface displaceable according to pure rotation movement, especially to a primary control surface such as an elevator or a rudder, or a spoiler, without departing from the scope of the present invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for mechanical connection of a control surface to a fixed structural element of an aircraft, comprising articulation means for connecting the control surface to said fixed structural element according to an axis of articulation, as well as driving means for driving the control surface in rotation relative to said fixed structural element about said axis of articulation, said driving means comprising at least one rotary actuator comprising a chassis frame and an output member displaceable in rotation about an output axis of the rotary actuator relative to said chassis frame, wherein said driving means comprise:

first detachable means for rotationally securing said chassis frame of the rotary actuator to a first element of said fixed structural element and said control surface, these first detachable means aligning said output axis of the rotary actuator with said axis of articulation;

second detachable means for rotationally securing said output member of the rotary actuator to a second element of said fixed structural element and said control surface distinct from said first element; and wherein said articulation means are separate from said rotary actuator and support said control surface independently of said rotary actuator.

2. The device according to claim 1, wherein said articulation means comprise at least one pivot shaft on which at least one element of said fixed structural element and said control surface is mounted in rotation.

3. The device according to claim 2, wherein said articulation means comprise means for rotationally connecting said pivot shaft to the other element of said fixed structural element and said control surface.

4. The device according to claim 3, wherein said rotation drive means comprise coupling means for coupling said output member of said rotary actuator to said pivot shaft.

5. The device according to claim 1, wherein said driving means comprise means for mechanical connection of said second element to an eccentric part of said output member of the rotary actuator, said eccentric part being eccentric relative to said output axis of the rotary actuator.

6. The device according to claim 5, wherein said output member of the rotary actuator comprises a lever comprising said eccentric part of said output member.

7. The device according to claim 1, wherein said chassis frame of said rotary actuator takes the form of a cylinder the axis of which is parallel to said output axis of the rotary actuator.

8. The device according to claim 7, wherein said first detachable means comprise means for fastening a transversal end wall of the rotary actuator to said first element.

9. The device according to claim 7, wherein said first detachable means comprise means for fastening a lateral wall of the rotary actuator to said first element.

10. A wing element for an aircraft comprising a fixed structural element designed to be fixed to the structure of an aircraft, as well as at least one control surface displaceable in rotation relative to said fixed structural element, characterized in that it comprises at least one device for mechanical connection of said control surface to said fixed structural element, according to claim 1.

11. The wing element according to claim 10, wherein said chassis frame of each rotary actuator of said device for mechanical connection takes the form of a cylinder of revolution extending tangentially to an external aerodynamic surface of said wing element.

12. The wing element according to claim 10, wherein said device for mechanical connection comprises a thermal dissipation element in contact with said chassis frame of each rotary actuator of the device and having at least one external surface fitting into an external aerodynamic surface of the wing element.

13. The wing element according to claim 10, wherein said device for mechanical connection comprises a thermal dissipation element made in a single piece with said chassis frame of each rotary actuator of the device and having at least one external surface fitting into an external aerodynamic surface of the wing element.

14. An aircraft, comprising at least one wing element according to claim 10.

* * * * *